United States Patent [19]

Marsh

[11] Patent Number: 5,594,179
[45] Date of Patent: Jan. 14, 1997

[54] TRACER TYPE FLOWMETER AND METHOD USING TWO OR MORE INJECTED TRACE MATERIALS

[75] Inventor: Lawrence B. Marsh, Buckeystown, Md.

[73] Assignee: Marsh-McBirney, Inc., Frederick, Md.

[21] Appl. No.: 553,985

[22] Filed: Nov. 6, 1995

[51] Int. Cl.⁶ ................................................. G01F 1/708
[52] U.S. Cl. ................................... 73/861.07; 73/861.05
[58] Field of Search .......................... 73/861.05, 861.07; 250/303, 356.2

[56] References Cited

U.S. PATENT DOCUMENTS

| | | | |
|---|---|---|---|
| 3,075,077 | 1/1963 | Staker et al. ........................... | 250/366.2 |
| 3,108,184 | 10/1963 | Hull . | |
| 3,477,461 | 11/1969 | Clayton et al. . | |
| 3,522,035 | 7/1970 | Putman . | |
| 3,722,291 | 3/1973 | Lindberg ............................... | 73/863.81 |
| 3,727,048 | 4/1973 | Haas ...................................... | 250/302 |
| 3,729,987 | 5/1973 | Chao et al. ........................ | 73/861.67 X |
| 3,881,351 | 5/1975 | Prachar ................................. | 73/861.04 |
| 3,930,411 | 1/1976 | Beeker et al. ............................ | 73/223 |
| 3,988,926 | 11/1976 | Haas .................................. | 73/861.07 X |
| 4,055,083 | 10/1977 | Haas ...................................... | 73/861.04 |
| 4,107,525 | 8/1978 | Hart, Jr. .................................. | 250/303 |
| 4,153,418 | 5/1979 | Haas ........................................ | 436/139 |
| 4,166,392 | 9/1979 | Farnworth ........................... | 73/863.31 |
| 4,167,870 | 9/1979 | Haas ...................................... | 73/861.04 |
| 4,178,919 | 12/1979 | Hall ........................................ | 128/719 |
| 4,197,456 | 4/1980 | Fleischer et al. ...................... | 250/303 |
| 4,805,450 | 2/1989 | Bennett et al. ............................ | 73/155 |
| 4,811,741 | 3/1989 | Shell et al. ............................. | 128/691 |
| 4,861,986 | 8/1989 | Arnold ................................. | 73/155 X |
| 4,897,797 | 1/1990 | Free, Jr. et al. ....................... | 364/500 |
| 5,063,772 | 11/1991 | Wellington et al. ..................... | 73/40.7 |
| 5,127,264 | 7/1992 | Schmalz ........................... | 73/861.05 X |
| 5,171,450 | 12/1992 | Hoots ...................................... | 210/701 |

FOREIGN PATENT DOCUMENTS 229210  10/1985  Germany .
59-120814  12/1982  Japan .
936037  9/1963  United Kingdom .

OTHER PUBLICATIONS

Groat, Chemi–Hydrometry and its Application to the Precise Testing of Hydroelectric Generators, Dec. 15, 1915.
Wright et al, Application of Flourescent Tracing Techniques to Hydrologic Studies, Jun. 1964.
Replogle et al, Flow Measurements with Flourescent Tracers, Sep. 1966.
Iso, Liquid Flow Measurement in Open Channels, Sep. 15, 1973.
ISCO Stormwater Runoff Guide Approx. 1994.
Kilpatrick et al, Measurement of Discharge Using Tracers, 1985.
Collection of Abstracts from Various Publications.

*Primary Examiner*—Richard Chilcot
*Assistant Examiner*—Paul D. Amrozowicz
*Attorney, Agent, or Firm*—Laubscher & Laubscher

[57] ABSTRACT

An improved flowmeter apparatus and method for accurately determining the liquid flow rate in a conduit and the mass flow rate of selected pollutant components entrained in the flow stream characterized by injecting at least two trace materials into the flow stream at a plurality of locations and, after allowing adequate time for the trace materials to reach a downstream sampling location, collecting a plurality of samples of liquid from the flow stream containing the trace materials. By comparing the concentrations of the trace materials found in the sample, the degree of mixing of the trace materials in the flow stream, and hence the accuracy of the flow stream flow rate and pollutant component mass flow rate measurements, can be evaluated. Other injecting methods for more thoroughly mixing the trace materials with the flow stream are also disclosed.

16 Claims, 2 Drawing Sheets

TRACER TYPE FLOWMETER AND METHOD USING TWO OR MORE INJECTED TRACE MATERIALS

FIELD OF THE INVENTION

The present invention relates to an improved flowmeter and method for accurately measuring the rate of flow of a liquid flowing in a conduit, such as a pipe or open channel. The flowmeter includes an injector which injects at least two different trace materials into the flowing liquid, a sampler which collects samples of the liquid containing concentrations of the trace materials, and an analyzer which determines the concentrations of the trace materials in the sample. The instantaneous flow rate of the liquid, which is functionally related to the concentration of each trace material in the sample, is then calculated as a function of the flow rate of the trace materials injected into the liquid and the ratio of the initial and sampled concentration of the trace materials. Since two or more trace materials are used, the degree of mixing, and hence the accuracy of the flow measurement, can be determined by comparing the concentrations of the trace materials measured in the sample. The flowmeter can also be used to measure the mass flow rate of pollutants flowing in the liquid by further analyzing the sample for particular pollutants and multiplying the instantaneous flow rate of the liquid by the concentration of each pollutant.

BRIEF DESCRIPTION OF THE PRIOR ART

Many devices currently available for measuring the flow rate of wastewater streams utilize flow proportional sampling. With this technique, the rate at which a sample is taken is a function of the flow rate of the sampled media. This flow rate is generally monitored by an independent flowmeter, normally an electronic device, and the output from this flowmeter is a contact switch that closes after a preset quantity of liquid has passed the flowmeter measuring site. This contact activates a sampler to take a sample that is proportionally weighted according to the flow rate of the stream.

After the sampling has been completed, the samples are taken to a laboratory for analysis. A separate record of the flow rate is taken by the operator of the flowmeter device so that the actual volume of pollutants can be calculated from the combination of the pollutant concentration in each sample bottle multiplied by the volumetric flow rate obtained separately from the flowmeter device.

Another method used for monitoring flow involves adding chemicals to the flow stream. For example, flow can be measured by injecting slugs of salt into the flow stream and measuring the time it takes for the slugs to be detected at a measuring point a fixed distance downstream.

Another chemical technique for measuring flow rate is known as the "dye dilution" technique. This technique consists of injecting a fluid containing a known concentration of a detectable dye into a flowing stream. Downstream, after thorough mixing has taken place, a sample is taken from the stream, whereupon the concentration of the dye at the downstream sampling point is measured. Knowing the concentration of the injected dye upstream and its rate of injection and the concentration of the dye taken from the downstream location, the flow rate can be determined using the equation: Flow Rate=Dye Concentration injected multiplied by Dye Injection Rate divided by Dye Concentration (downstream).

The total accuracy of this technique is based on the accuracy of the measurement of the concentrations of both the injected dye and the sampled water containing dye, the accuracy of the measurement and uniformity of the injection rate of the dye at the upstream point, and the degree to which the injected dye and the flowing stream mix into a homogeneous mixture. In most situations, the major unknown factor is the degree to which proper mixing has taken place. Mixing can be improved by having multiple injection points, using mechanical mixers, or by pre-mixing the dye with a large volume of fluid prior to injection into the stream. In addition to improving accuracy, thorough mixing close to the injection point allows the length of the channel required between the injection point and the sampling point to be minimized.

The Hass U.S. Pat. No. 3,727,048 discloses a chemical tracer method and apparatus for determining the instantaneous and total mass flow and volume flow of a selected component of a flowing fluid. The total mass flow of the fluid component is determined by injecting a chemical tracer into the flowing fluid at a known mass flow rate, taking a mixed sample of the flowing fluid and tracer, analyzing the concentration of tracer and the concentration of the selected component, determining the ratio of the tracer to the selected component, integrating the ratio over a predetermined time, and multiplying the result by the mass flow rate of the tracer injected into the main fluid flow. The subsequent Hass U.S. Pat. Nos. 4,055,083, 4,153,418, and 4,167,870 disclose related chemical tracer methods and apparatus.

The Hart, Jr. U.S. Pat. No. 4,107,525 discloses a flowmeter device which measures flow by comparing the rate of diffusion of some preselected tracer substance with the rate of flow of the fluid, the flow rate of the fluid being related to the transport quantities of the tracer substance by the fluid.

The Fleischer et al U.S. Pat. No. 4,197,456 discloses a liquid flowmeter which uses a preselected tracer substance injected into a flowing liquid to measure the rate of flow of the liquid.

The Pracher U.S. Pat. No. 3,881,351 and Bennett et al U.S. Pat. No. 4,805,450 disclose using a tracer injected into a gaseous stream to measure the mass flow rate of the gas or of a constituent contained in the stream.

None of these prior devices measure the degree of mixing of the tracer substance and, as such, have an unknown degree of inaccuracy. If the tracer substance is not uniformly and thoroughly mixed throughout the fluid stream, the trace material concentration will not accurately represent the flow rate of the fluid.

The present invention was developed to overcome these and other drawbacks of the prior devices by providing an improved tracer-type flowmeter which can measure the degree of mixing of the trace materials flowing in a liquid from a single sample, and thereby ensure a degree of accuracy of the flow rate measurement for each sample taken at different times and/or at different flow rates. The flowmeter includes an injector for injecting a known quantity and concentration of at least two trace materials into the flow stream being measured, and a sampler located downstream from the injector for collecting at least one sample of the flow stream, or for collecting two or more samples simultaneously. The samples are then analyzed to determine the concentration of the trace materials which are compared to determine the degree of mixing and to calculate the flow rate of the flow stream. The mass flow rate of selected pollutants flowing in the liquid can also be measured by analyzing the samples for the pollutant concentrations and multiplying this concentration by the fluid flow rate.

SUMMARY OF THE INVENTION

Accordingly, it is a primary object of the present invention to provide a tracer-type liquid flowmeter and method for measuring the flow rate of a liquid flowing in a conduit, such as a pipe or open channel, with a known degree of uncertainty. The flowmeter includes an injector which injects a known quantity and concentration of at least two trace materials into the flow stream being measured, and a sampler located downstream from the injector for collecting a single sample, or two or more samples simultaneously. Each sample contains a proportion of the trace materials and liquid and is analyzed to determine the concentration of the trace materials. The trace material concentrations are then compared to determine the degree of mixing of the trace materials in the liquid and, if an adequate degree of mixing has been achieved, the sample concentrations are used to calculate the flow rate of the flow stream.

It is a further object of the present invention to provide a tracer-type flowmeter which can be used to determine the mass flow rate of a pollutant component contained in the liquid flow stream based on the concentration of the pollutant component contained in a sample of the liquid.

It is another object of the invention to provide a tracer-type flowmeter having a mixer arranged between the injector and the sample collector for thoroughly mixing the trace materials in the liquid.

It is yet a further object of the invention to provide a tracer-type flowmeter having a control system which automatically triggers the operation of the injector and the sample collector, such as at preselected time intervals, or following a rain fall event of a predetermined amount.

BRIEF DESCRIPTION OF THE DRAWINGS

Other objects and advantages of the invention will become apparent from a study of the following specification when viewed in light of the accompanying drawings, in which.

DETAILED DESCRIPTION

Figure 1:
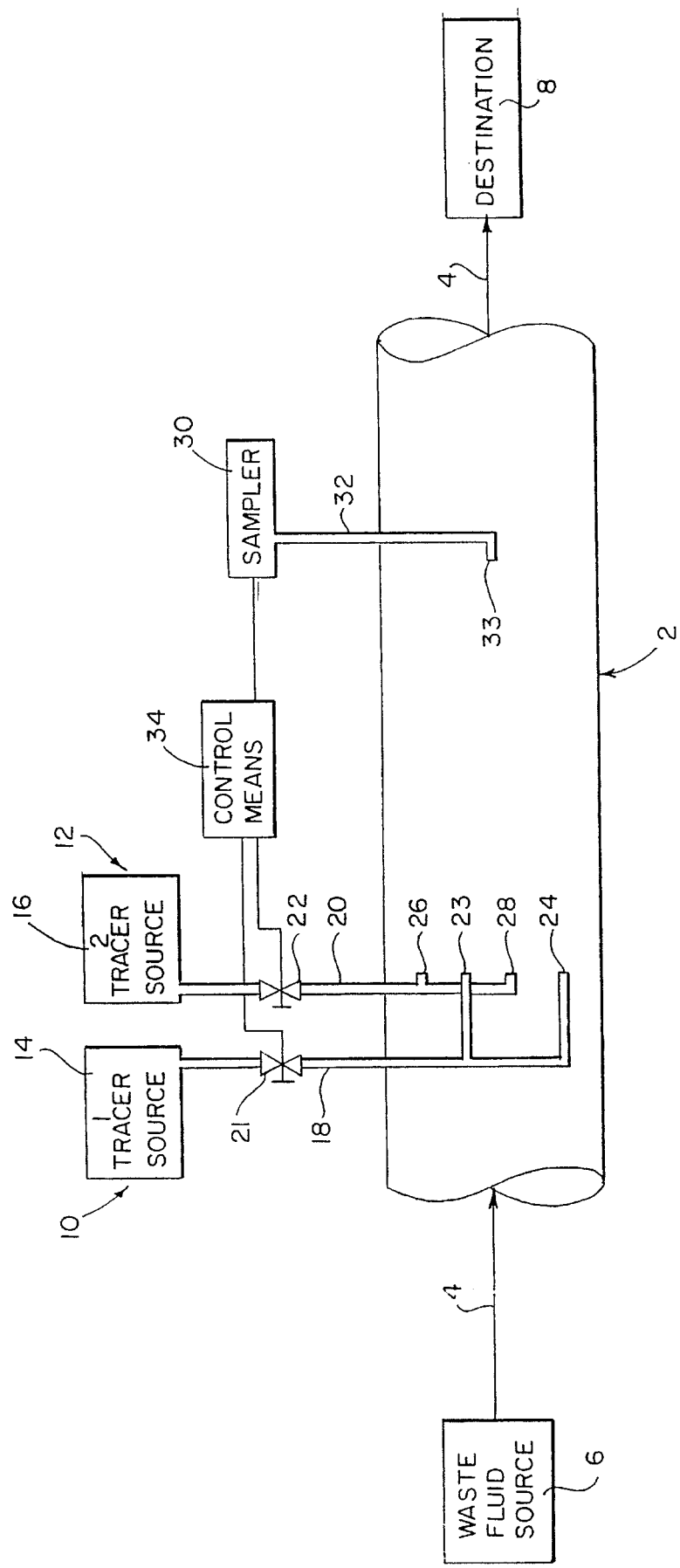
FIG. 1 is a diagrammatic illustration of the apparatus according to the invention.

Referring first to FIG. 1, the tracer-type flow measuring system is used to measure the flow of liquid, such as sewage, flowing in conduit 2 in the direction indicated by the arrows 4 from an upstream source 6 to a downstream destination 8. The system includes a pair of injectors 10, 12 arranged in the upstream portion of the conduit for injecting two different trace materials or dyes into the flow stream along the same upstream cross-section but at different points within the cross-section. By injecting two or more trace materials into the flow stream, the degree of mixing, and hence the flow rate measurement accuracy, can be assessed.

Each injector, which may be, for example, a drip bag, includes a bag or storage reservoir 14, 16 containing a trace material, a nozzle 18, 20 extending into the conduit, and a flow regulator 21, 22, such as a valve, arranged in the corresponding nozzles which allows a continuous and constant quantity of each trace material to be injected into the flow stream. Alternatively, injection of the trace materials can be accomplished using a conventional pump.

The trace materials may be any measurable chemical substance such as, for example, a fluorescent dye.

To thoroughly disperse the trace materials throughout the liquid, each drip bag nozzle portion 18, 20 introduces the trace materials into the flow stream at a plurality of separate transverse points 23, 24 and 26, 28, respectively, located in essentially the same cross-section of the flow stream but at different points within the cross-section. More thorough mixing of the trace materials in the flow stream may also be accomplished by injecting the trace materials using high pressure air or by pre-mixing the trace materials with water so that a greater volume of liquid can be injected into the flow stream.

A sampler 30 is arranged downstream from the injectors 10, 12 at a distance sufficient to ensure adequate mixing and includes a conduit 32 which extends into the flow stream. The end portion of the conduit includes a port 33 which serves to collect a sample.

The sampler 30 and injectors 10, 12 are controlled by a control means 34. The control means may be activated manually, automatically at selected time intervals, or following a given event, such as, for example, a rainfall event of a given amount.

In this way, the system, via the injectors, injects the trace materials into the flow stream at a plurality of separate locations and allows the degree of mixing which has occurred between the upstream injection site and the downstream sampling site to be evaluated.

In a two-trace material system, only one sample is needed to determine the degree of mixing. This is accomplished by analyzing the sample for both trace materials and comparing them. If, for instance, each has been injected into the flow stream at the same rate and concentration, the sample will contain the same concentration of each if complete mixing has occurred. If, on the other hand, the sampled concentrations differ, the differences will indicate, to some extent, the lack of mixing. In addition, in a multiple-trace material system, the trace material concentrations can be averaged and used to calculate, more accurately, the flow rate through the conduit.

Figure 2:
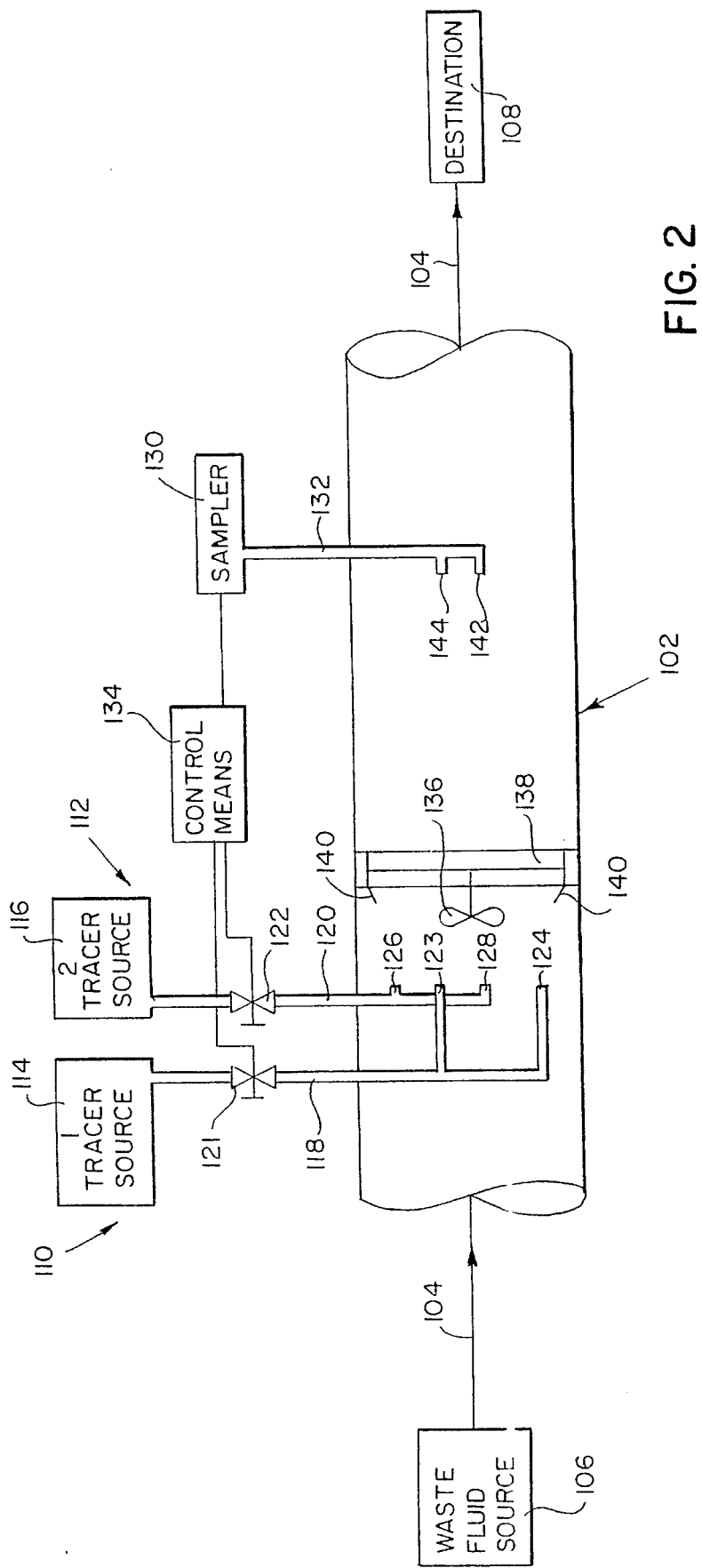
FIG. 2 is a diagrammatic illustration of the apparatus of FIG. 1 with a mechanical mixer and two sampling ports.

As shown in FIG. 2, another alternative for thoroughly mixing the trace materials in the flow stream includes placing a mechanical mixing device 136, such as a conventional mixer, baffles, or other such mechanical obstruction that creates turbulence, in the flow stream. Moreover, the mixing device is mounted on the conduit with a band 138 having turbulence-inducing baffles or tabs 140 which extend into the flow stream, thereby creating an additional agitating action downstream from the injection point whereby more immediate and thorough mixing is achieved.

To further ensure that thorough mixing has been achieved, samples are taken simultaneously at two different locations 142, 144 along the same transverse plane of the flow stream in the conduit. If the measured concentrations of the trace materials in each sample are roughly equivalent, there is a greater likelihood that thorough mixing has been achieved. As explained above, however, multiple sampling is not necessary to evaluate the degree of mixing but provides an added measure of certainty.

In addition, it will be apparent that the injection flow rates of the different trace materials may be different. As long as the rate for each trace material is constant, continuous for the sampling interval, and known, the flow rate of the fluid flow stream can be determined based on each trace material in a single sample.

Operation

To measure the volumetric flow rate of the stream flowing in the conduit, the controller is activated and a known concentration and flow rate of each trace material is injected into the flow stream.

Next, after allowing adequate time for the trace materials to reach the downstream sampling location, samples are taken. These samples contain a concentration of each trace material, liquid from the flow stream, and any pollutants entrained in the flow stream. The samples are then analyzed to determine the concentration of each trace material which is in turn used to calculate the instantaneous flow rate of the flow stream using the equation $$Q = \left[ \left[ \frac{c_{i1}}{c_{s1}} \times q_{t1} + \frac{c_{i2}}{c_{s2}} \times q_{t2} \right] \right] \div 2$$

where Q is the flow rate of the flow stream, $C_{i1}$ and $C_{i2}$ are the initial concentrations of the trace materials injected into the flow stream, $C_{s1}$ and $C_{s2}$ are the diluted concentrations of the trace materials as measured in the sample, and $q_{t1}$ and $q_{t2}$ are the injection flow rates of each trace material.

Next, the concentrations of each trace material measured in the sample are compared to evaluate the degree of mixing. If the mixing is deemed inadequate, the data can be discarded. If two samples are taken simultaneously, the concentrations can be averaged to obtain a more accurate measurement.

To determine the mass flow rate of a selected pollutant component entrained in the flow stream, the sample is analyzed to determine the concentration of the pollutant. The mass flow rate is then calculated using the equation $$m_p = Q (C_{ps})$$

where $m_p$ is the mass flow rate of the pollutant passing the measuring point, Q is the instantaneous flow rate of the stream as calculated above, and $C_{ps}$ is the concentration of the pollutant in the sample.

While in accordance with the provisions of the Patent Statutes the preferred forms and embodiments of the invention have been illustrated and described, it will be apparent to those of ordinary skill in the art that various changes and modifications may be made without deviating from the inventive concept set forth above.

What is claimed is:

1. Apparatus for measuring the rate of flow of liquid flowing in a conduit, comprising:
    (a) injecting means for injecting a known quantity and concentration of at least two trace materials into the liquid;
    (b) sample collecting means arranged in the liquid downstream from said injecting means for collecting at least one sample containing the liquid and a concentration of said trace materials;
    (c) concentration determining means for determining said concentration of said trace materials in said sample;
    (d) comparing means for comparing said concentration of said trace materials in said sample; and
    (e) calculating means for calculating the flow rate of the liquid as a function of said trace material concentrations in said sample.

2. Apparatus as defined in claim 1, wherein said injecting means introduces said two trace materials at different locations in the conduit, respectively.

3. Apparatus as defined in claim 1, wherein said injecting means introduces at least one of said trace materials at different locations in the conduit.

4. Apparatus as defined in claim 1, wherein said sample collecting means obtains a plurality of samples simultaneously.

5. Apparatus as defined in claim 1, wherein the liquid contains a concentration of at least one pollutant component, and further comprising pollutant analyzing means for determining said pollutant component concentration in said sample.

6. Apparatus as defined in claim 5, and further comprising means for determining the mass flow rate of said at least one pollutant component based on said liquid flow rate and said pollutant component concentration.

7. Apparatus as defined in claim 1, wherein said trace materials include at least two florescent dyes.

8. Apparatus as defined in claim 1, and further comprising mixing means intermediate said injecting means and said sample collecting means for mixing said liquid and said trace materials.

9. Apparatus as defined in claim 8, wherein said mixing means include mixing baffles mounted on the conduit.

10. Apparatus as defined in claim 1, wherein said injecting means comprises two pumps.

11. Apparatus as defined in claim 1, wherein said injecting means comprises two drip bags.

12. Apparatus as defined in claim 1, wherein said trace material is injected with pressurized air.

13. Apparatus as defined in claim 1, and further including control means for automatically triggering the operation of said injecting means and said sample collecting means.

14. A method for measuring, with a known degree of uncertainty, the rate of flow of a liquid flowing in a conduit, comprising:
    (a) injecting a known quantity and concentration of at least two trace materials into the liquid;
    (b) collecting at least one sample of said liquid containing a concentration of said trace materials;
    (c) determining said concentration of said trace materials in said sample;
    (d) comparing said concentration of said trace materials in said sample, whereby the degree of mixing of said trace materials in the liquid is determined; and
    (e) calculating the flow rate of the liquid as a function of said trace material concentrations in said sample.

15. The method as defined in claim 14, and further including:
    (e) determining the concentration of a pollutant component contained in said liquid; and
    (f) determining the mass flow rate of said pollutant component as a function of said pollutant component concentration and said liquid flow rate.

16. The method as defined in claim 14, wherein said calculated flow rate is based on an average of said trace material concentrations in said sample.

* * * * *